United States Patent [19]

Baker

[11] Patent Number: 4,909,669
[45] Date of Patent: Mar. 20, 1990

[54] PIPELINE JOINT PROTECTOR

[76] Inventor: Ralph Baker, 14711 Hoya Ct., Houston, Tex. 77070

[21] Appl. No.: 273,847

[22] Filed: Nov. 21, 1988

Related U.S. Application Data

[63] Continuation-in-part of Ser. No. 889,765, Jul. 28, 1986, abandoned.

[51] Int. Cl.$^4$ ............................................. F16L 1/04
[52] U.S. Cl. ..................................... 405/168; 138/192; 405/158; 405/166
[58] Field of Search ............... 405/166, 169, 168, 154, 405/156, 158, 170, 171, 169; 285/45–54, 21; 138/172, 177, 141, 109, 155

[56] References Cited

U.S. PATENT DOCUMENTS

| | | | |
|---|---|---|---|
| 2,761,949 | 9/1956 | Colton | 285/47 X |
| 3,321,925 | 5/1967 | Shaw | 405/166 |
| 3,744,823 | 7/1973 | Muir et al. | 285/47 X |
| 3,801,140 | 4/1974 | Keller | 285/47 |
| 4,103,505 | 8/1978 | Howerton | 405/166 |
| 4,449,852 | 5/1984 | Muszynski | 405/166 X |

Primary Examiner—Dennis L. Taylor
Attorney, Agent, or Firm—H. Coke Wilson, Provel, Gambrell, Hewitt, Kimball & Krieger

[57] ABSTRACT

A pipeline joint protector which comprises a sheet of high density plastic material which is adapted to encircle the exposed end portions of abutting lengths of pipe which are wrapped or covered with concrete weight coating substantially throughout their lengths with only short end sections of the pipe exposed. The pipeline protector extends radially outwardly from the central pipe to approximately the diameter of the weight coat material and substantially spans the space between adjacent portions of weight coat material on the abutting joints of pipe welded together to form the pipe joint. The pipe joint protector includes high density plastic or elastomeric rubber material which substantially fills the lower one half of the annular space between the plastic sheet and pipe between adjacent weight coat sections.

11 Claims, 2 Drawing Sheets

PIPELINE JOINT PROTECTOR

This application is a continuation-in-part of prior application Ser. No. 889,765 filed July 28, 1986, now abandoned and co-pending prior application, Ser. No. 07/017,830 now U.S. Pat. No. 4,808,031.

BACKGROUND OF THE INVENTION

It is common practice to apply weight coat to a pipeline which is located in a water bottom area to protect the pipe from the elements and also to provide sufficient weight to maintain the pipeline submerged and in a non-buoyant condition. Weight coat is frequently made of a concrete material several inches thick which is applied around the circumference of the pipe and is usually applied to line pipe on each joint prior to adjacent joints of pipe being joined together by welding. The weight coat is applied to the full length of the pipe except for a short distance approximately one foot on each end. These exposed end portions are provided to facilitate welding adjacent exposed ends together to make up the pipeline. Various structures or devices have been employed from time to time to fill the space around the welded exposed pipe joint and between the adjacent sections of weight coat material. Examples of these prior art devices include devices such as are shown in U.S. Pat. Nos. 4,449,852; 4,103,505 and 4,002,137. Other weight coat prior are devices include patents such as U.S. Pat. Nos. 3,232,637 and 3,240,512 which are means for weighting underwater pipelines. None include structures such as the present invention which provides a relatively inexpensive and reliable protective sleeve which protects the pipe and also provides a weight bearing structure to carry a part of the weight of the made up pipeline as it passes over the rollers on the may barge and on the lay barge stinger. This device may be quickly and easily installed manually, i.e., with hand tools, as the pipe is being strung by the lay barge. The present invention does not require elaborate forming apparatus and is sufficiently strong to withstand impact by trawler boards and the concentrated stress imposed on the pipe by support rollers and particularly the end roller on the stinger attached to a lay barge.

SUMMARY OF THE INVENTION

The present invention includes a thermoplastic impact member or sheet having relatively high compressive strength which is wrapped around a pipe joint formed by welding abutting ends of pipe together. This wrapped portion or sleeve overlaps the ends of the weight coat material adjacent to the joint and is attached to the pipeline by means of straps that encircle the sleeve or by screws or rivets or other means such as by welding one end of the sheet material to the adjacent outer surface of the sheet after being wrapped around the pipeline. Reinforcing members such as plastic bars or tubes may be affixed to the interior of the sleeve to increase its rigidity and impact resistance. Alteratively, as will be described in detail, some form of high impact material substantially fills the lower portion of the annulus formed between the pipe and the plastic sheet spanning the area between adjacent section of weight coat material to provide support for the pipeline as it passes over the rollers on the lay barge.

The high impact material provides greater load bearing properties then the sheet plastic alone so as to protect the pipe and any coating thereon from damage from the lay barge rollers or other pipe handling equipment. The fill material used in the lower portion of the surrounding high density plastic sheet is preferably a polymer composite either foamed or solid or an elastomeric rubber. Such fill materials should have high impact resistance to absorb the shock loading experienced by the pipe at the roller on the rear end of the lay barge while going into the water. The fill material may be configured in a "C" shape or some other configuration to substantially fill the area and should not interrupt the flow of cathodic protection for the pipe. The high impact plastic member is of a Cross-sectional thickness which is substantially the same as a thickness of the weight coat material which has been provided on the pipe to substantially fill the annular area adjacent to the weight coated material.

DESCRIPTION OF THE PREFERRED EMBODIMENT

Figure 1:
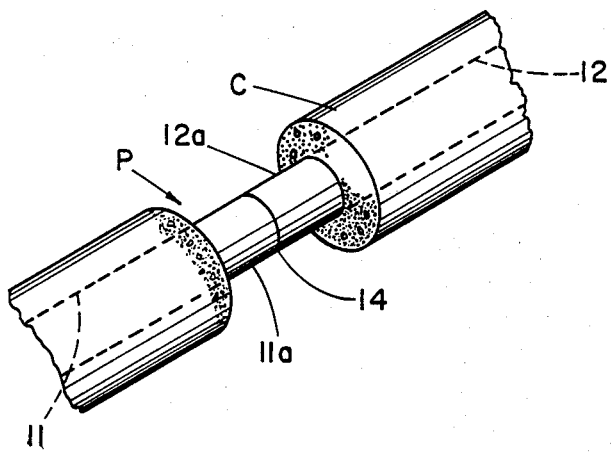
FIG. 1 is an isometric view showing two adjacent joints of pipe with their ends in abutting relationship with the weight coat material applied to the pipe.

FIG. 1 of the drawings shows a pipeline designated generally P having a weight coat C which is formed of concrete or other suitable material that is applied to the pipe joints 11 and 12 which are connected together at Joint 14. As shown, the pipes 11 and 12 are disposed centrally of the weight coat C which extends circumferentially around the joints of pipe and longitudinally thereof. A portion of the pipes are designated 11a and 12a adjacent their ends which are connected in the joint 14 are not covered by the weight coat C. This uncovered area adjacent the ends is provided to enable the joint 14 to be formed by welding the abutting ends of the points of pipe 11 and 12 together to form a continuous pipeline.

Figure 3A:
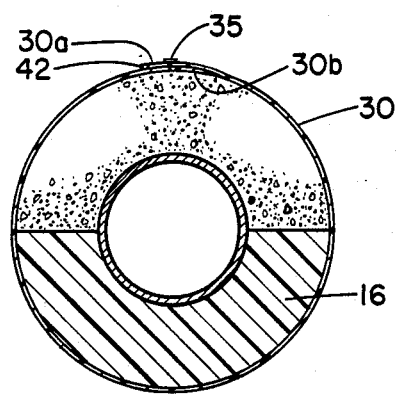
FIG. 3A is a sectional view taken on line 4—4 of FIG. 3 showing he high impact protective material on the pipe.
Figure 3:
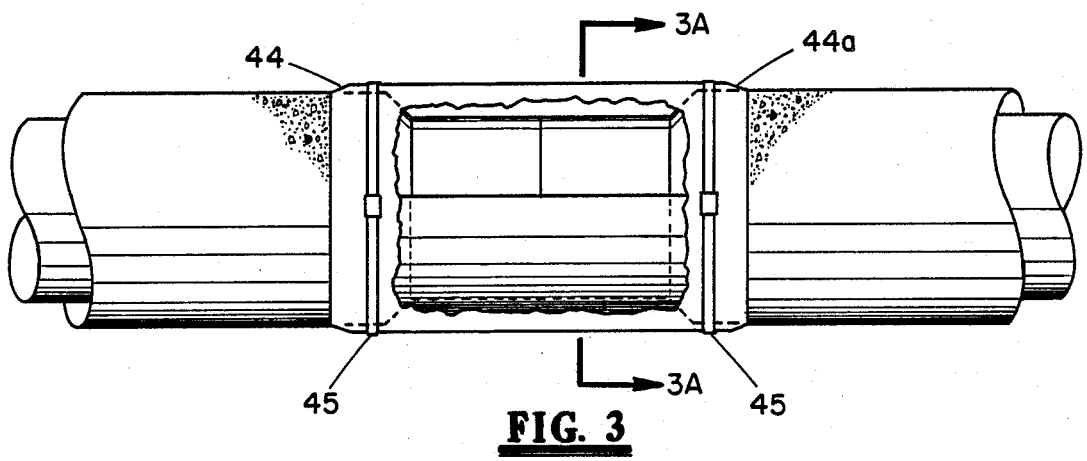
FIG. 3 is a longitudinal view, partially cut away, showing the sleeve and reinforcing material on a pipe joint.

A shown in FIGS. 3 and 3A of the drawings, the high impact material 16 is installed beneath the pipes 11 and 12 in the annular space between the pipes and the surrounding plastic sheet 30. The plastic sheet 30 is preferably a high density plastic material which is wrapped around the pipe joint 14 formed with the end portions 33 of the plastic sleeve 30 overlaying the ends of the weight coat material C on each of the pipe segments 11 and 12. The edge portions 30a and 30b of the sheet material 30 overlap each other and are fixed in this overlapping relationship on the pipe by means of straps or screws 35 or rivets or other suitable pin means. The first or outer edge portion of the sleeve that overlaps the inner edge is welded to the outer surface of the sleeve by conventional plastic welding means to form a longitudinally extending plastic weld extending from end to end of the sleeve. Also, if desired, the overlapping edge portion may be tack welded to the sleeve or screws 35 or rivets may be driven through both adjacent edge portions of the sleeve and into the weight coat material to temporarily hold one edge of the sleeve 30 in position relative to the opposite edge during welding of the overlapping portion to the body of the sheet 30. The sleeve 30 also forms a protective barrier to protect such pipes against impact by trawler boards which are carried by seines or drag nets through the water by fishing trawlers and the high impact filler 16 is provided to cushion the pipe as it is passed over the rollers on the lay barge and particularly the last roller at the end of the stinger which is usually the last roller to support the pipe as it enters the water and thus a place at which the protective sleeve is subjected to very high loading forces. The force of an impact by such trawler boards or by the deep keel of a boat moving through the water can cause serious damage to the section of pipe between adjacent portions of weight coat material C. Therefore, the apparatus of the present invention provides a pipeline joint protective sleeve that has an outer diameter that is substantially the same as the outer diameter of the weight coat material C so that the laid line is free of any sharp edge or projection that may snag a net or seine drug along the water bottom.

Figure 4:
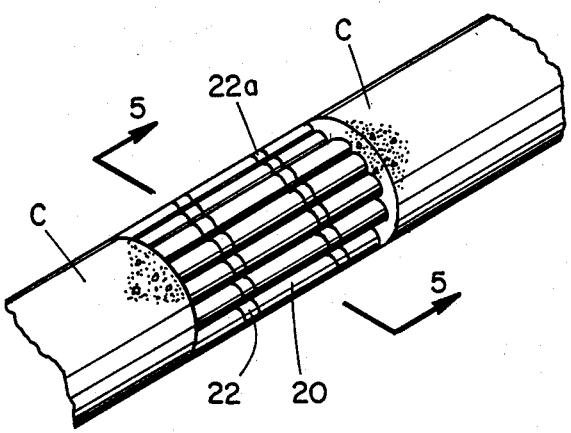
FIG. 4 is a cut away isometric view of a plurality of the protective members jointed together by straps preparatory to the plastic sleeve being installed in position on the pipe as shown in FIG. 5.
Figure 5:
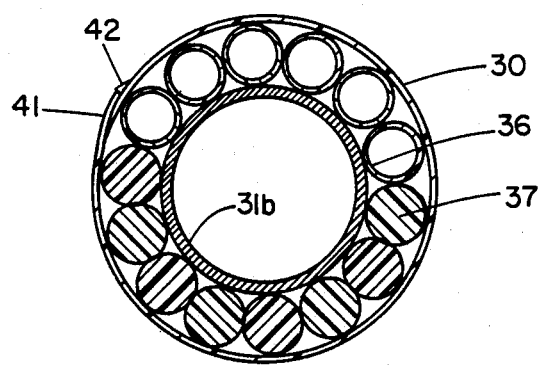
FIG. 5 is a sectional view taken on line 5—5 of FIG. 4 with a high density plastic sheet wrapped around the weight coat material with protective members around the pipe.

Shown in FIGS. 4 and 5 of the drawings is an alternative embodiment of the present invention in which impact members 36 and 37 are arranged in side-by-side relationship and connected together by means of transverse straps 22 and 22a that are interwoven around the plastic members such as 36 and 37 to form a continuous barrier of such plastic members. Such plastic impact members may be made of polyethylene or other substantial rigid plastic material having characteristics of high impact resistance. The free ends of the straps may be tied or otherwise secured together after the continuous barrier of plastic members (FIG. 4) has been wrapped around exposed and portions 11a and 12a of the line P. Thus wrapped, as shown in FIG. 4, the plastic members surround the central pipe and substantially fill the space around the pipe between adjacent sections of weight coat material C. Thus, it will be appreciated that with the plastic tubular barrier wrapped around the exposed pipe in the position as shown in FIG. 4 of the drawings the pipe line will be protected against impact by various devices such as trawler boards which might otherwise damage the exposed pipe joint. Also, it will be appreciated that the tubular members shown in the drawings (FIG. 5) may either be hollow as shown at 36, or solid in cross-section as shown at 37, and such pieces may have other configurations other than cylindrical or tubular and may in fact be cut with truncated pie-shaped pieces having a larger arc of curvature on the exterior than on the interior adjacent the joint of pipe.

The impact tubes 36 may be filled with weighted polyurethane foam or other filler material to add impact resistance to the tubes.

Also, in this embodiment, the plurality of longitudinal stringers or reinforcing tubes or bars of plastic or other suitable rigid material in the annular space around the central pipes 11 and 12 may be wrapped with the outer sleeve 30 as shown in FIG. 5 of the drawing. Such reinforcing members are preferably of a cross-sectional diameter to fill the radial space between the pipes 11 and 12 and the sleeve 30. Also, the reinforcing members are of sufficient length to extend substantially the full distance between the adjacent end of the weight coat material C on the pipes 11 and 12.

It will be appreciated that such reinforcing members can be attached to the sheet 30 by tack welding or continuous welds or screws or other means an that spaces may be provided between adjacent longitudinal members, as desired. However, in this embodiment it is preferred that the cross-sectional dimension of the rigid bars or tubes extend from the pipe to the sleeve 30.

Figure 2:
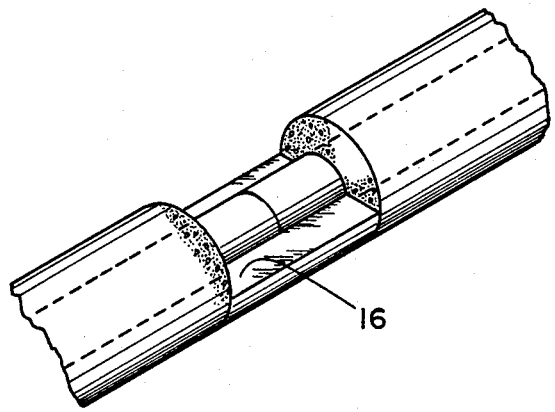
FIG. 2 is an isometric view showing the high impact material in the lower one-hall, of the annular space around the pipe.

In installing the pipe joint protection sleeve of the preferred embodiment of the present invention as shown in FIG. 2 of the drawings, a flat sheet of high density plastic material 30 is positioned around a pipe joint with the impact resistant member 16 either preformed and inserted during installation or, if desired, high density foam material may be injected into the annular space formed by the plastic sheet around the pipe P and allowed to set-up or form in place. The sheet 30 is wrapped around the pipe joint with the sheet edges overlaying the weight coat material on pipes 11 and 12 and the end portions of the sheet overlapping one another as indicated in the drawings. A weld is preferably placed along the exposed outer edge of the sheet secure it to the adjacent surface of tee sheet 30. Two or more straps or bands 45, preferably metallic, are placed in spaced apart relationship and near the opposite ends of the sleeve to wrap it tightly around the adjacent ends of the weight coat material C to hold the sleeve in place while the outer exposed edge is being welded to the adjacent surface of the sheet 30. The weld area is indicated at 42 on FIGS. 3A and 5.

Also as shown the edges 44 and 44a of the sheet are tapered to a relatively thin edge to facilitate longitudinal movement of the pipeline on to and of off rollers on the lay barge and stinger. Also the tapered edges provide a relatively smooth transition area between the weight coat and the sleeve to reduce the likelihood that objects, such as trawler nets, will become snagged on the pipeline.

Figure 6:
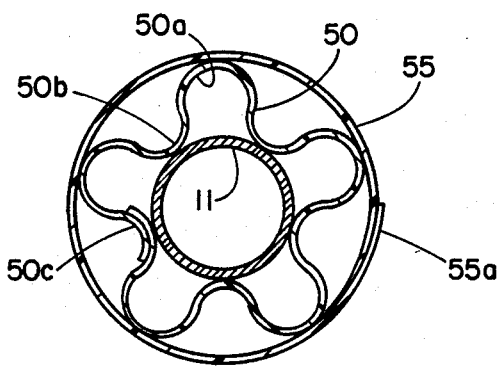
FIG. 6 is a cross section showing a corrugated protective member between the sleeve and the pipe.

FIG. 6 shown yet another embodiment of the protective sleeve apparatus of the present invention wherein a corrugated spacer 50 is provided in the annular space between the exterior of the line pipe 11 and the outer high density plastic sleeve 55. As shown, the corrugated spacer 50 is comprised of a sheet formed into a series of alternating curved surfaces creating rounded ridges 50a which engage the outer sleeve 55 and valleys 50b which engage the pipe 11 with overlapping end portions 50c, which, if desired, may be welded together. The outer sleeve 55 is formed of a flat sheet with overlapping ends 55a that are secured together as described with the respect to the sheet in the FIG. 3A embodiment. It will be appreciated that the flat sheet or sleeve may be perforated at one or more points to allow sea water to fill any voids in the sleeve if desired to enhance corrosion protection.

The foregoing disclosure and description of the invention are illustrative and explanatory thereof, and various changes in the size, shape and materials, as well as in the details of the illustrated construction may be made without departing from the spirit of the invention.

I claim:

1. A pipeline protective apparatus for protecting joint ends of weight coated pipe comprising:
   (a) a plurality of longitudinally extending impact members adapted to extend longitudinally of a pipeline and spanning the space between adjacent sections of pipe with weight coat material secured thereto;
   (b) sheet plastic adapted to be wrapped around the ends of the weight coat material o each pipe joint for securing the longitudinally extending impact members to the pipe spanning the space between adjacent sections of weight coat material; and
   (c) means for attaching overlapping edges of such plastic sheet together to secure it to the pipeline.

2. The invention of claim 1 wherein said impact members comprise solid plastic rods.

3. The invention of clam 1 wherein said impact members comprise hollow plastic tubes.

4. The invention of claim 1 wherein said impact member comprise weighted foam filed hollow plastic tubes.

5. A weight coated pipeline joint protective apparatus for protecting pipeline joints against impact or high stress concentrations comprising a high density plastic sheet wrapped around a pipeline joint with the opposite edges of such sheet overlaying the weight coat material on the abutting pipes forming the joint, with the first end of the sheet overlapping the wrapped sheet with means for securing such first end to the sheet surface near or adjacent the opposite end of such sheet, with high density material substantially filling the lower one half of the annular space between the pipe and the plastic sheet and between adjacent weight coat sections.

6. The invention of claim 5 wherein the means for securing said first end to the sheet near its opposite end comprises a weld formed between said first end and the adjacent surface of the wrapped sheet.

7. The invention of claim 5 wherein the means for securing said first end to the sheet near its opposite end comprises screw means extending through said overlapping end portions of said wrapped sheet.

8. The invention of claim 5 wherein the means for securing said first end to the sheet near its opposite end comprises strap means extending around the circumference of said wrapped sheet.

9. The invention of claim 5 including a rigid reinforcing means substantially filling the annular space between the pipe joint and the sleeve wrapped around said pipe joint.

10. The invention of claim 9 wherein said rigid reinforcing means extend longitudinally substantially the full length between adjacent ends of the weight coat material on the abutting pipe joints.

11. The invention of claim 1 including a corrugated sheet of high density plastic material extending around the pipe joint within the annular space between the pipe and the high density plastic sheet overlaying the ends of the weight coat material.

* * * * *